United States Patent
Hong et al.

(10) Patent No.: US 11,769,901 B2
(45) Date of Patent: Sep. 26, 2023

(54) SEPARATOR FOR RECHARGEABLE BATTERY, METHOD OF PREPARING THE SAME AND RECHARGEABLE LITHIUM BATTERY INCLUDING THE SAME

(71) Applicant: SAMSUNG SDI CO., LTD., Yongin-si (KR)

(72) Inventors: Daehyun Hong, Suwon-si (KR); Dowon Kim, Suwon-si (KR); Taejoon Park, Suwon-si (KR); Imhyuck Bae, Suwon-si (KR); Jaehyun Cho, Suwon-si (KR); Suna Lee, Suwon-si (KR)

(73) Assignee: SAMSUNG SDI CO., LTD., Yongin-si (KR)

( * ) Notice: Subject to any disclaimer, the term of this patent is extended or adjusted under 35 U.S.C. 154(b) by 263 days.

(21) Appl. No.: 16/910,437

(22) Filed: Jun. 24, 2020

(65) Prior Publication Data
US 2021/0005861 A1    Jan. 7, 2021

(30) Foreign Application Priority Data

Jul. 3, 2019    (KR) .................. 10-2019-0080272

(51) Int. Cl.
*H01M 10/0525* (2010.01)
*H01M 50/46* (2021.01)
(Continued)

(52) U.S. Cl.
CPC ....... *H01M 10/0525* (2013.01); *H01M 4/623* (2013.01); *H01M 4/626* (2013.01);
(Continued)

(58) Field of Classification Search
CPC .... H01M 4/623; H01M 4/626; H01M 50/449; H01M 50/451; H01M 50/446;
(Continued)

(56) References Cited

U.S. PATENT DOCUMENTS

2014/0302389 A1*  10/2014  Hasegawa ........... H01M 50/489
                                                     429/251
2016/0036027 A1*   2/2016  Nishikawa .......... H01M 50/491
                                                     429/145

(Continued)

FOREIGN PATENT DOCUMENTS

JP    2011-074260 A    4/2011
JP    2012-150972 A    8/2012

(Continued)

OTHER PUBLICATIONS

Machine translation of JP2017152268A (Year: 2017).*
Machine translation of JP2016072150A (Year: 2016).*

*Primary Examiner* — Allison Bourke
*Assistant Examiner* — Jason Barton
(74) *Attorney, Agent, or Firm* — Lee IP Law, P.C.

(57) ABSTRACT

A separator for a rechargeable battery, a method of preparing a separator, and a rechargeable lithium battery, the separator including a porous substrate; and at least one coating layer on one surface of the porous substrate, wherein the coating layer includes a fluorine-containing binder, a filler, and an additive, the fluorine-containing binder has a concentration gradient in which a concentration thereof in the coating layer increases toward an outer surface of the separator in a thickness direction of the separator, an infrared spectral intensity of a C—F group of the fluorine-containing binder is greater than 0.0030 to less than 0.0050, the additive is a hydrocarbon polymer compound that includes a carboxyl group, and a weight average molecular weight of the hydrocarbon polymer compound is about 5,000 g/mol to about 15,000 g/mol.

18 Claims, 2 Drawing Sheets

(51) Int. Cl.
  *H01M 50/403*  (2021.01)
  *H01M 50/489*  (2021.01)
  *H01M 50/451*  (2021.01)
  *H01M 50/457*  (2021.01)
  *H01M 4/62*  (2006.01)
  *H01M 4/02*  (2006.01)

(52) U.S. Cl.
  CPC ....... *H01M 50/403* (2021.01); *H01M 50/451* (2021.01); *H01M 50/457* (2021.01); *H01M 50/46* (2021.01); *H01M 50/489* (2021.01); *H01M 2004/021* (2013.01); *H01M 2004/027* (2013.01); *H01M 2004/028* (2013.01)

(58) Field of Classification Search
  CPC ............. H01M 50/457; H01M 50/489; H01M 50/403; H01M 50/46; H01M 10/0525; H01M 2004/021; H01M 2004/027; H01M 2004/028
  See application file for complete search history.

(56) References Cited

U.S. PATENT DOCUMENTS

2016/0329566 A1* 11/2016 Jung ................. H01M 10/0525
2021/0210783 A1*  7/2021 Nagasawa ................ C08K 5/02

FOREIGN PATENT DOCUMENTS

| JP | 2015-84719 A |   | 5/2015 |   |
|----|---|---|---|---|
| JP | 2016072150 A | * | 5/2016 | .......... H01M 50/491 |
| JP | 2016-186921 A |   | 10/2016 |   |
| JP | 2017-152268 A |   | 8/2017 |   |
| KR | 2003-0034427 A |   | 5/2003 |   |
| KR | 10-1029672 B1 |   | 4/2011 |   |
| KR | 10-2013-0126445 A |   | 11/2013 |   |
| KR | 10-1430975 B1 |   | 8/2014 |   |
| KR | 10-2019-0022125 A |   | 3/2019 |   |
| KR | 10-2019-0135262 A |   | 12/2019 |   |

* cited by examiner

SEPARATOR FOR RECHARGEABLE BATTERY, METHOD OF PREPARING THE SAME AND RECHARGEABLE LITHIUM BATTERY INCLUDING THE SAME

CROSS-REFERENCE TO RELATED APPLICATION

Korean Patent Application No. 10-2019-0080272, filed on Jul. 3, 2019, in the Korean Intellectual Property Office, and entitled: "Separator for Rechargeable Battery, Method of Preparing the Same and Rechargeable Lithium Battery Including the Same," is incorporated by reference herein in its entirety.

BACKGROUND OF THE INVENTION

1. Field

Embodiments relate to a separator for a rechargeable battery, a method of preparing a separator for a rechargeable battery, and a rechargeable lithium battery including the same.

2. Description of the Related Art

A non-aqueous rechargeable lithium battery may include a separator made of a porous insulating film, between positive and negative electrodes, and the pores of the film may be impregnated by an electrolyte including a lithium salt dissolved therein. The non-aqueous rechargeable lithium battery may have excellent high capacity and high energy density characteristics.

SUMMARY

The embodiments may be realized by providing a separator for a rechargeable battery, the separator including a porous substrate; and at least one coating layer on one surface of the porous substrate, wherein the coating layer includes a fluorine-containing binder, a filler, and an additive, the fluorine-containing binder has a concentration gradient in which a concentration thereof in the coating layer increases toward an outer surface of the separator in a thickness direction of the separator, an infrared spectral intensity of a C—F group of the fluorine-containing binder is greater than 0.0030 to less than 0.0050, the additive is a hydrocarbon polymer compound that includes a carboxyl group, and a weight average molecular weight of the hydrocarbon polymer compound is about 5,000 g/mol to about 15,000 g/mol.

The infrared spectral intensity of the C—F group of the fluorine-containing binder may be greater than 0.0035 to less than 0.0050.

The fluorine-containing binder may have a crystallinity degree of about 48% to about 58%.

The fluorine-containing binder may have a crystal size of about 1 nm to about 5 nm.

The fluorine-containing binder may be a vinylidene fluoride polymer.

The fluorine-containing binder may be a vinylidene fluoride homopolymer or a copolymer including a unit of vinylidene fluoride and a unit of another monomer.

The fluorine-containing binder may include a functional group including a carboxyl group.

The fluorine-containing binder may have a weight average molecular weight of about 800,000 g/mol to about 1,300,000 g/mol.

The fluorine-containing binder may be included in an amount of about 20 wt % to about 30 wt %, based on a total weight of the coating layer.

The filler may include a metal oxide, a semi-metal oxide, a metal fluoride, a metal hydroxide, or a combination thereof.

The filler may have a concentration gradient in which a concentration thereof in the coating layer decreases toward the outer surface of the separator in the thickness direction of the separator.

The additive may be included in an amount of greater than 0.35 wt % to less than 1.25 wt %, based on the total weight of coating layer.

The coating layer may have a surface roughness (Rq) of about 150 nm to about 300 nm.

The coating layer may have a surface pore size of about 50 nm to about 1,000 nm.

The embodiments may be realized by providing a method of preparing a separator, the method including preparing a composition for forming a coating layer by dispersing a fluorine-containing binder, a filler, and an additive in a solvent; coating the composition for forming the coating layer on one or both surfaces of a porous substrate; and drying it under a humidified atmosphere of about 40° C. to about 80° C. and an absolute aqueous vapor amount of about 10 g/m³ to about 25 g/m³, wherein the additive is a hydrocarbon polymer compound including a carboxyl group, and a weight average molecular weight of the hydrocarbon polymer compound is about 5,000 g/mol to about 15,000 g/mol.

The additive may be included in an amount of greater than 0.35 wt % to less than 1.25 wt %, based on a total weight of the coating layer.

The drying may be performed in a humidified atmosphere of a temperature of about 50° C. to about 70° C. and an absolute aqueous vapor amount of about 10 g/m³ to about 20 g/m³.

The embodiments may be realized by providing a rechargeable lithium battery including a positive electrode; a negative electrode; the separator for a rechargeable battery according to an embodiment between the positive electrode and the negative electrode; and an electrolyte solution.

At least one of the positive electrode and negative electrode may include an electrode active material and an electrode binder, and a ratio (C2/C1) of a crystallinity degree (C2) of the electrode binder to a crystallinity degree (C1) of the fluorine-containing binder may be about 1.40 to about 1.60.

The electrode binder may have a crystallinity degree of about 70% to about 80%.

The electrode binder may be a vinylidene fluoride homopolymer or a copolymer including a unit of vinylidene fluoride and a unit of another monomer.

BRIEF DESCRIPTION OF THE DRAWINGS

Features will be apparent to those of skill in the art by describing in detail exemplary embodiments with reference to the attached drawings in which.

DETAILED DESCRIPTION

Figure 1:
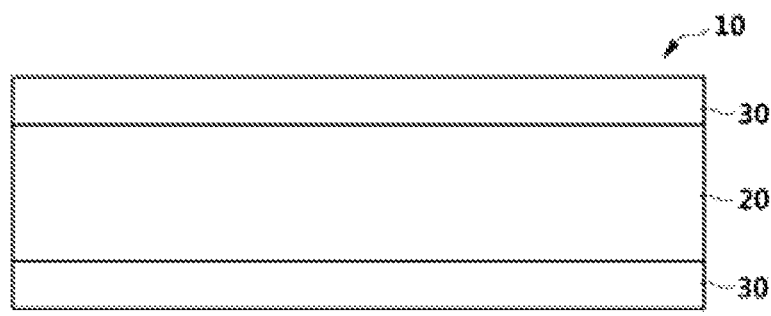
FIG. 1 illustrates a cross-sectional view of a separator for a rechargeable battery according to an embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. It will also be understood that when a layer or element is referred to as being "on" another layer or element, it can be directly on the other layer or element, or intervening layers may also be present. In addition, it will also be understood that when a layer is referred to as being "between" two layers, it can be the only layer between the two layers, or one or more intervening layers may also be present. Like reference numerals refer to like elements throughout.

Hereinafter, a separator for a rechargeable battery according to an embodiment is described. FIG. 1 is a view illustrating a separator for a rechargeable battery to an embodiment. Referring to FIG. 1, the separator 10 for a rechargeable battery according to an embodiment may include a porous substrate 20 and a coating layer 30 on one or both (e.g., opposing) surfaces of the porous substrate 20.

The porous substrate 20 may be a substrate having a plurality of pores that is suitably used in electrochemical devices. Examples of the porous substrate 20 may be a polymer film formed of a polymer, or a copolymer or a mixture of two or more selected from polyolefin such as polyethylene, polypropylene, and the like, a polyester such as, polyacetal, polyamide, polyimide, polycarbonate, polyetheretherketone, polyaryletherketone, polyetherimide, polyamideimide, polybenzimidazole, polyethersulfone, polyphenyleneoxide, a cyclic olefin copolymer, polyphenylenesulfide, polyethylenenaphthalate, a glass fiber, Teflon, and polytetrafluoroethylene.

The porous substrate 20 may be, e.g., a polyolefin-based substrate and the polyolefin-based substrate may help improve has safety of a battery due to its improved shutdown function. The polyolefin-based substrate may be, e.g., selected from a polyethylene single film, a polypropylene single film, a polyethylene/polypropylene double film, a polypropylene/polyethylene/polypropylene triple film, and a polyethylene/polypropylene/polyethylene triple film. In an implementation, the polyolefin-based resin may further include a non-olefin resin in addition to an olefin resin or a copolymer of olefin and a non-olefin monomer.

The porous substrate 20 may have a thickness of about 1 μm to about 40 μm, e.g., about 1 μm to about 30 μm, about 1 μm to about 20 μm, about 5 μm to about 15 μm, or about 10 μm to about 15 μm.

The coating layer 30 on one surface or both surfaces of the porous substrate 20 may include a fluorine-based or fluorine-containing binder, a filler, and an additive. The fluorine-containing binder may have a concentration gradient in which the concentration increases toward a surface (e.g., outer surface of the coating layer 30) with reference to a thickness direction of the separator 10. In an implementation, an infrared spectral intensity of the C—F group of the fluorine-containing binder may be, e.g., about 0.0030 to about 0.0050. In an implementation, the additive may be a hydrocarbon polymer compound including a carboxyl group. In an implementation, a weight average molecular weight of the hydrocarbon polymer compound may be about 5,000 g/mol to about 15,000 g/mol.

The distribution of the fluorine-containing binder along the thickness direction of the separator 10 for a secondary battery is analyzed by using Attenuated Total Reflection infrared spectroscopy (ATR-IR spectroscopy). After cutting the separator 10 for secondary batteries into L100 mm×W100 mm size to prepare specimens, it is mounted on the ATR crystal of the FT-IR spectroscopy and infrared rays are entered at a 45 degree angle. Then, the intensity distribution of the IR wavelength of the CF group is measured as a functional group of the fluorine-containing binder to evaluate the distribution of the binder.

As noted above, the fluorine-containing binder may have a concentration gradient in which the concentration increases toward a surface with reference to a thickness direction of the separator 10. For example, the fluorine-containing binder may be distributed in the coating layer 30 such that the concentration increases from the interface between the porous substrate 20 and the coating layer 30 to the outer surface of the coating layer 30. When the fluorine-containing binder is excessively distributed on or concentrated at the surface of the separator 10, high IR intensity measured by the FT-IR measuring instrument may be shown. In an implementation, the infrared spectral intensity of the C—F group of the fluorine-containing binder included in the separator 10 may be greater than 0.0030 and less than 0.0050, e.g., greater than 0.0030, greater than or equal to about 0.0031, greater than or equal to about 0.0032, greater than or equal to about 0.0033, greater than or equal to about 0.0034, greater than or equal to about 0.0035, greater than or equal to about 0.0036, greater than or equal to about 0.0037, greater than or equal to about 0.0038, greater than or equal to about 0.0039, or greater than or equal to about 0.0040 and less than 0.0050, less than or equal to about 0.0049, less than or equal to about 0.0048, less than or equal to about 0.0047, less than or equal to about 0.0046, less than or equal to about 0.0045, less than or equal to about 0.0044, less than or equal to about 0.0043, less than or equal to about 0.0042, or less than or equal to about 0.0041. Maintaining the infrared spectral intensity of the separator 10 at greater than 0.0030 may help prevent a reduction in a cell stiffness. Maintaining the infrared spectral intensity of the separator 10 at less than 0.0050 may help prevent an undesirable reduction in an adhesion force of the substrate.

As a result, by decreasing a content of the fluorine-containing binder based on a total amount of fluorine-containing binder of the separator 10 (decrease of the coating amount of the fluorine-containing binder), adhesion between the separator and the electrode may be improved, while the separator 10 is made into a thin film, as the distribution of the fluorine-containing binder on the surface of the separator 10 increases. Thinning of the battery may be realized and a cycle-life may be increased. In addition, increasing the distribution of the fluorine-containing binder on the surface of the separator 10 may help prevent or reduce generation of voids at the interface of the separator/electrode and may help prevent or reduce deposition of lithium, improving cycle-life of a battery.

In order to help improve the adhesion of the separator, simply increasing the content of the fluorine-containing binder, e.g., increasing the coating amount of the fluorine-containing binder, could cause a drastic reduction in a capacity recovery rate of the battery due to an increase in air permeability and it may be difficult to obtain high capacity.

In the separator 10 according to the embodiment, the content of the fluorine-containing binder may be reduced, and the distribution of the fluorine-containing binder may be improved.

The fluorine-containing binder may have a crystallinity degree of about 48% to about 58%, e.g. about 50% to about 58%, or about 51% to about 56%. If the crystallinity degree of the fluorine-containing binder is greater than about 48%, the rigidity of the coating layer 30 of the separator may be maintained, and a peel strength and adhesion to the electrode may be desirably improved. In addition, when the crystallinity degree of the fluorine-containing binder is less than or equal to about 58%, air permeability of the coating layer 30 of the separator may be increased, so that impregnation of an electrolyte solution may be improved and a battery having a low internal resistance may be manufactured. For example, battery performance may be improved.

The crystallinity degree of the fluorine-containing binder is a measured crystallinity degree of the fluorine-containing binder included in the coating layer 30 after forming the coating layer 30, using an NMR spectrum.

The fluorine-containing binder may have a crystal size of about 1 nm to about 5 nm. When the crystal size of the fluorine-containing binder is within the range, the fluorine-containing binder may be finely crystallized and uniformly distributed in the coating layer 30. The adhesion between the separator/electrode may be improved and the porous structure of the coating layer 30 may be maintained.

The crystal size of the fluorine-containing binder may be calculated from Scherrer's equation represented by Equation 1 using a graph obtained by the X-ray diffraction method.

$$D = K \cdot \Lambda / \beta \cos \theta \quad \text{[Equation 1]}$$

D: crystal size
K: Scherrer constant
Λ: X-ray wavelength
β: full width at half maximum
θ: Bragg angle of diffraction ray In Equation 1, K is applied as a Scherrer constant of 1, Bragg angle of the diffraction ray is applied to 2θ=20°, and X-ray wavelength (Λ) of 0.1542 nm is applied because CuKα is used to the target.

The fluorine-containing binder included in the separator according to an embodiment may be a vinylidene fluoride polymer. In an implementation, the vinylidene fluoride polymer may be, e.g., a vinylidene fluoride homopolymer or a copolymer including a unit of a vinylidene fluoride monomer and a unit of another monomer. In an implementation, the copolymer may include, e.g., a unit (first unit) of vinylidene fluoride and one or more other units (second unit) of chlorotrifluoroethylene, trifluoroethylene, hexafluoropropylene, ethylene tetrafluoride, or ethylene monomer. For example, the copolymer may be a polyvinylidene fluoride-hexafluoropropylene (PVdF-HFP) copolymer including a unit of a vinylidene fluoride monomer and a unit of a hexafluoropropylene monomer.

In the copolymer, the first unit and the second unit may be present in a mole ratio of about 9:1 to about 5:5.

The copolymer may also be in various forms, e.g., an alternating polymer in which the first and second units are alternately distributed, a random polymer in which they are randomly distributed, or a graft (or block) polymer in which a portion of structural units are grafted.

The fluorine-containing binder may include a functional group including a carboxyl group. It is possible to prevent a sedimentation phenomenon of the filler, the cross-linked binder, and the like included in the coating layer to implement improved adhesion between the porous substrate of the separator/coating layer, and the coating layer/electrode.

In an implementation, the fluorine-containing binder may have a weight average molecular weight of, e.g., about 800,000 g/mol to about 1,300,000 g/mol. In an implementation, the fluorine-containing binder may have a weight average molecular weight of, e.g., greater than or equal to about 800,000 g/mol, greater than or equal to about 850,000 g/mol, greater than or equal to about 900,000 g/mol, greater than or equal to about 950,000 g/mol, greater than or equal to about 1,000,000 g/mol, greater than or equal to about 1,050,000 g/mol, greater than or equal to about 1,100,000 g/mol, or greater than or equal to about 1,150,000 g/mol and less than or equal to about 1,300,000 g/mol, less than or equal to about 1,250,000 g/mol, or less than or equal to about 1,200,000 g/mol. When the range is satisfied, the fluorine-containing binder and the separator 10 including the same may have improved adhesion. For example, when the weight average molecular weight of the fluorine-containing binder is greater than or equal to about 800,000 g/mol, the adhesion to the electrode is improved, and when the weight average molecular weight of the fluorine-containing binder is less than or equal to about 1,300,000 g/mol, it may be easy to coat and form the coating layer 30 on the porous substrate and to implement a suitable porous structure of the coating layer 30.

The weight average molecular weight may be a polystyrene reduced average molecular weight measured using gel permeation chromatography.

In an implementation, the fluorine-containing binder may have a glass transition temperature of, e.g., about −20° C. to about −40° C. or about −25° C. to about −35° C. In an implementation, a melting temperature of the fluorine-containing binder may be, e.g., less than or equal to about 220° C. or about 100° C. to about 210° C. When the glass transition temperature and/or the melting temperature of the fluorine-containing binder satisfies the above ranges, the fluorine-containing binder and the separator 10 including the same may have improved adhesion.

The glass transition temperature may be a value measured by differential scanning calorimetry.

The fluorine-containing binder may be prepared by various suitable methods such as emulsion polymerization, suspension polymerization, bulk polymerization, solution polymerization, or bulk polymerization.

The fluorine-containing binder may help improve an adhesion force of the substrate between the porous substrate 20 and the coating layer 30, and may help improve stability and impregnation of an electrolyte solution of the separator 10 to improve high-rate charge/discharge characteristics of the battery.

The fluorine-containing binder may be included in the coating layer in an amount of, e.g., about 20 wt % to about 30 wt %, based on a total weight of the coating layer. In an implementation, fluorine-containing binder may be included in the coating layer in an amount of, e.g., greater than or equal to about 20 wt %, greater than or equal to about 21 wt %, greater than or equal to about 22 wt %, greater than or equal to about 23 wt %, and less than or equal to about 30 wt %, less than or equal to about 29 wt %, less than or equal to about 28 wt %, less than or equal to about 27 wt %, or less than or equal to about 26 wt %, based on the total weight of the coating layer 30. When the fluorine-containing binder is included in the above range, it is possible to improve the adhesion between the separator/electrode and air permeability of the separator.

The filler may help prevent the separator 10 from shrinking or deforming rapidly due to a temperature rise. The filler may be, e.g., an inorganic filler, an organic filler, an organic/inorganic composite filler, or a combination thereof.

In an implementation, the inorganic filler may be a ceramic material capable of improving heat resistance, and may include, e.g., a metal oxide, a metalloid oxide, a metal fluoride, a metal hydroxide, or a combination thereof. In an implementation, the inorganic filler may include, e.g., $Al_2O_3$, $SiO_2$, $TiO_2$, $SnO_2$, $CeO_2$, MgO, NiO, CaO, GaO, ZnO, $ZrO_2$, $Y_2O_3$, $SrTiO_3$, $BaTiO_3$, $Mg(OH)_2$, boehmite, or a combination thereof.

In an implementation, the organic filler may include, e.g., an imide compound, an amide compound, or a combination thereof. In an implementation, the organic filler may have a core-shell structure.

The filler may have a spherical shape, a sheet shape, a cubic shape, or an amorphous shape. In an implementation, an average particle diameter of the filler may be about 1 nm to about 2500 nm, e.g., about 100 nm to about 2000 nm, or about 200 nm to about 1000 nm, or about 300 nm to about 800 nm. By using the filler having an average particle diameter within the ranges, the coating layer 30 may have an appropriate strength to help improve heat resistance, durability, and stability of the separator 10. The filler may include a mixture of two or more different types of fillers or two or more fillers (e.g., of the same material) having different sizes.

The average particle diameter of the filler may be particle size ($D_{50}$) at a volume ratio of 50% in a cumulative size-distribution curve. The filler may have a concentration gradient in which the concentration decreases toward the surface with reference to the thickness direction of the separator 10.

In an implementation, the filler may be included in an amount of, e.g., about 70 wt % to about 90 wt %, about 72 wt % to about 88 wt %, or about 75 wt % to about 85 wt %, based on the total weight of the coating layer 30. When the filler is included within the ranges, the separator 10 for a rechargeable battery according to an embodiment may have improved heat resistance, durability, oxidation resistance, and stability. For example, when the filler is included in the above range, a thermal shrinkage rate of the separator 10 for the rechargeable battery according to an embodiment may be greatly improved.

The additive included in the separator according to an embodiment may be a hydrocarbon polymer compound including a carboxyl group. A weight average molecular weight of the hydrocarbon polymer compound may be, e.g., about 5,000 g/mol to about 15,000 g/mol.

The hydrocarbon polymer compound may include a head group including a carboxyl group structure and a tail group including a hydrocarbon polymer structure. The hydrocarbon polymer structure may include a substituted or unsubstituted aliphatic hydrocarbon group, e.g., an alkylene group. The carboxyl group structure may react with —OH groups partially present on the surface of the filler (e.g., inorganic particles) to form a chemical bond, and the hydrocarbon polymer structure may interact with the fluorine-containing binder. For example, the additive may separate the fluorine-containing binder and the filler into each layer in the coating layer 30 of the separator. As a result, it may affect the pore size of the coating layer 30, and the fluorine-containing binder may have a concentration gradient in which the concentration increases toward the surface with reference to the thickness direction of the separator 10 and the range of infrared spectral intensities of the CF group may be well satisfied.

Maintaining the weight average molecular weight of the hydrocarbon polymer compound at less than 100,000 g/mol may help prevent the fluorine-containing binder and the additive from being undesirably aggregated.

In an implementation, the additive may include 400 to 1500 carbons, for example, greater than or equal to 450 carbons, greater than or equal to 500 carbons, greater than or equal to 550 carbons, greater than or equal to 600 carbons, greater than or equal to 650 carbons, greater than or equal to 700 carbons, greater than or equal to 750 carbons, greater than or equal to 800 carbons, greater than or equal to 850 carbons, greater than or equal to 900 carbons, greater than or equal to 950 carbons, greater than or equal to 1000 carbons, greater than or equal to 1050 carbons, greater than or equal to 1100 carbons, greater than or equal to 1150 carbons, greater than or equal to 1200 carbons and less than or equal to 1450 carbons, less than or equal to 1400 carbons, less than or equal to 1350 carbons, less than or equal to 1300 carbons, less than or equal to 1250 carbons, less than or equal to 1200 carbons, less than or equal to 1150 carbons, less than or equal to 1100 carbons, less than or equal to 1050 carbons, less than or equal to 1000 carbons, less than or equal to 950 carbons, less than or equal to 900 carbons, less than or equal to 850 carbons, less than or equal to 800 carbons, less than or equal to 750 carbons, or less than or equal to 700 carbons.

In an implementation, the additive may be included in an amount of, e.g., greater than 0.35 wt % to less than 1.25 wt %, based on a total weight of the coating layer 30. In an implementation, the additive may be included in an amount of, e.g., about 0.37 wt % to about 1.15 wt %, based on a total weight of the coating layer 30. For example, the additive may be included in an amount of about 0.5 parts by weight to about 1.5 parts by weight, based on 100 parts by weight of the filler. When the additive is included in an amount of greater than 0.35 wt %, based on the total weight of the coating layer 30, as described above, an effect of including the additive in the coating layer 30 of the separator may be appropriately implemented. When the additive is included in an amount of less than 1.25 wt %, the infrared spectral intensity range of the CF group of the fluorine-containing binder may be appropriate, to help improve an adhesion force between the coating layer and the porous substrate and an adhesion force between the separator and the electrode at the same time.

In an implementation, the coating layer 30 may have a surface roughness (Rq) of about 150 nm to about 300 nm, e.g., greater than or equal to about 150 nm, greater than or equal to about 160 nm, greater than or equal to about 170 nm, greater than or equal to about 180 nm, greater than or equal to about 190 nm, or greater than or equal to about 200 nm and less than or equal to about 300 nm, less than or equal to about 290 nm, less than or equal to about 280 nm, less than or equal to about 270 nm, less than or equal to about 260 nm, less than or equal to about 250 nm, less than or equal to about 240 nm, less than or equal to about 230 nm, less than or equal to about 220 nm, or less than or equal to about 210 nm. Within the above range, the fluorine-containing binder may be appropriately disposed not only on the left and right sides of the filler but also on the upper surface (electrode side in a thickness direction of the coating layer), even if the heat press process were to be performed mildly, the fluorine-containing binder of the coating layer 30 may be easily anchored toward the electrode interface, and adhesion at the interface between the separator/electrode and air permeability of the separator may be improved.

The surface roughness (Rq) is a value representing the average height of peak values and valley values with respect to the surface center and may be measured by atomic force microscopy (AFM).

The coating layer 30 may have a surface pore size of about 50 nm to about 1,000 nm. In an implementation, the surface pore size may be, e.g., about 100 nm to about 1,000 nm. The separator may help maintain an improved porous structure and exhibit improved adhesion between the separator and the electrode.

The coating layer 30 may have a thickness of about 0.01 μm to about 20 μm, e.g., about 0.5 μm to about 10 μm, about 1 μm to about 5 μm, or about 1 μm to about 3 μm.

A ratio of the thickness of the coating layer 30 to the thickness of the porous substrate 20 may be about 0.05 to about 0.5, e.g., about 0.05 to about 0.4, about 0.05 to about 0.3, or about 0.1 to about 0.2. The separator 10 including the porous substrate 20 and the coating layer 30 may exhibit improved adhesion.

In an implementation, the coating layer 30 may further include an additional binder, e.g., a cross-linked binder, in addition to the fluorine-containing binder.

In an implementation, the cross-linked binder may include, e.g., polymethyl methacrylate, polyacrylonitrile, polyvinylpyrrolidone, polyvinylacetate, a polyethylene-vinylacetate copolymer, polyethylene oxide, cellulose acetate, cellulose acetate butyrate, cellulose acetate propionate, cyanoethyl pullulan, cyanoethyl polyvinyl alcohol, cyanoethyl cellulose, cyanoethyl sucrose, pullulan, carboxymethyl cellulose, an acrylonitrile-styrene-butadiene copolymer, or a combination thereof.

The additional binder (cross-linked binder) may be included in an amount of about 1 part by weight to about 50 parts by weight, e.g., about 1 part by weight to about 40 parts by weight, based on 100 parts by weight of the fluorine-containing binder.

The separator 10 for a rechargeable battery may exhibit excellent adhesion to the electrode. The adhesion may be determined by measuring a peel strength when the separator 10 is adhered to the electrode plate and then peeling the separator 10 from the electrode plate.

Hereinafter, a method of preparing a separator for a rechargeable battery according to an embodiment is described in detail.

The method of preparing the separator for the rechargeable battery may include preparing a composition for forming a coating layer by dispersing a fluorine-containing binder, a filler, and an additive in a solvent, coating the composition for forming the coating layer on one or both surfaces of the porous substrate, and drying it under a humidified atmosphere at about 40° C. to about 80° C. and an absolute aqueous vapor amount of about 10 g/m³ to about 25 g/m³.

The fluorine-containing binder, filler, and additives of the composition for forming a coating layer are the same as described above.

The solvent may include a suitable solvent that is capable of dissolving or dispersing the fluorine-containing binder, filler, an additive, and optionally cross-linked binder. In an implementation, the solvent may be a non-aqueous solvent. For example, the non-aqueous based solvent may include acetone, N-methyl pyrrolidone (NMP), dimethyl acetate, or the like.

The coating may be performed by, e.g., a spin coating, a dip coating, a bar coating, a die coating, a slit coating, a roll coating, an ink jet printing, or the like.

The drying may be performed under a humidified atmosphere at about 40° C. to about 80° C. and an absolute aqueous vapor amount of about 10 g/m³ to about 25 g/m³. In an implementation, the drying may be performed under a humidified atmosphere through, e.g., natural drying, drying with warm air, hot air, or low wet air, vacuum drying, irradiation of far infrared rays or electron beam. In an implementation, the drying may be performed at a drying temperature of, e.g., about 50° C. to about 75° C., about 50° C. to about 70° C., or about 55° C. to about 75° C., and in the presence of an absolute aqueous vapor amount (on average) of, e.g., about 10 g/m³ to about 25 g/m³, about 10 g/m³ to about 20 g/m³, or about 12 g/m³ to about 18 g/m³. When the drying temperature and the absolute aqueous vapor amount fall in the above ranges, it is possible to form the coating layer 30 that includes the fluorine-containing binder having the crystallinity degree and the infrared spectral intensity of the C—F group within the ranges according to embodiments.

A method of controlling the crystallinity degree of the fluorine-containing binder resin itself may include, e.g., selection of a fluorine-containing binder resin. As the weight average molecular weight of the fluorine-containing binder resin is lower, the crystallinity may be decreased. For example, when using a fluorine-containing binder resin having a weight average molecular weight of 800,000 to 1,300,000 g/mol, the ranges of the crystallinity degree according to an embodiment may relatively easily be implemented. In addition, in polyvinylidene fluoride as an example of the fluorine-containing binder, the crystallinity degree may decrease as a copolymerization component is added. In addition, in terms of the structure of the polymer, the polyvinylidene fluoride resin in which $CF_2$ and $CH_2$ are randomly arranged may have a lower crystallinity degree, and such a polymer may be more easily prepared by emulsion polymerization than by suspension polymerization. Also, as the branched structure grows and the weight average molecular weight distribution is wider, the crystallinity degree may be decreased, respectively.

A method of controlling the crystallinity degree of the fluorine-containing binder when the coating layer 30 is formed may include, e.g., controlling of a drying temperature in the drying process. As the drying temperature increases, the crystallization degree of the fluorine-containing binder may be decreased because the drying of the coating layer is terminated before the crystallization of the resin is sufficiently achieved.

A method of controlling the infrared spectral intensity of the C—F group of the fluorine-containing binder in the coating layer 30 may include, e.g., including the additive in the composition for forming the coating layer. As described above, the additive may be a dispersing agent. As the dispersibility of the filler increases, the fluorine-containing binder may be more distributed toward the surface (electrode direction) of the coating layer. In addition, as the drying temperature decreases or the absolute aqueous vapor amount may increase during the preparation of the coating layer, the fluorine-containing binder may be distributed more toward the surface (electrode direction) of the coating layer.

The absolute aqueous vapor amount may be calculated by Equation 2 and may be adjusted by the relative humidity.

Absolute aqueous vapor amount=saturated aqueous
vapor amount at the temperature×relative
humidity (%)  [Equation 2]

Hereinafter, the rechargeable lithium battery including the above-described separator 10 for a rechargeable battery is described.

According to an embodiment, a rechargeable lithium battery may include an electrode including a positive electrode and a negative electrode, a separator for the rechargeable battery between the positive electrode and the negative electrode, and an electrolyte solution.

At least one of the positive electrode and negative electrode may include an electrode active material and an electrode binder. In an implementation, a ratio (C2/C1) of a crystallinity degree (C2) of the electrode binder to a crystallinity degree (C1) of the fluorine-containing binder may be about 1.40 to about 1.60. When the ratio of crystallinity (C2/C1) is within the above range, adhesion on the interface between the separator and the electrode may be improved to help shorten a movement path of lithium ions, and the battery cycle-life may be improved by preventing lithium deposition and dead lithium layers while improving the battery cycle-life, and resultantly collision safety may be improved.

The electrode binder may have a crystallinity degree of about 70% to about 80%. When the crystallinity degree of the electrode binder is within the above range, as the swelling phenomenon is reduced, the deformation of the electrode plate may be suppressed to help improve battery performance. In addition, adhesion on the interface between the separator and the electrode may be improved to help shorten a movement path of lithium ions, and the battery cycle-life may be improved by preventing lithium deposition and dead lithium layers while improving the battery cycle-life, improving collision safety.

The crystallinity degree of the electrode binder included in the electrode may be changed through the process of coating, drying, and compressing electrode slurry during manufacturing an electrode plate. In the compressing process, the compressing temperature may be, e.g., about 15° C. to about 35° C. or about 15° C. to about 25° C., to implement a crystallinity range of the electrode binder.

The electrode binder may include, e.g., a vinylidene fluoride homopolymer or a copolymer of a unit of vinylidene fluoride and a unit of another monomer. In an implementation, the copolymer may include, e.g., a unit (first unit) of vinylidene fluoride and one or more of units (second unit) of chlorotrifluoroethylene, trifluoroethylene, hexafluoropropylene, ethylene tetrafluoride, or ethylene monomer. For example, the copolymer may be a polyvinylidene fluoride-hexafluoropropylene (PVdF-HFP) copolymer (including a unit of a vinylidene fluoride monomer and a unit of a hexafluoropropylene monomer). In an implementation, the electrode binder may be different from the fluorine-containing binder.

In the copolymer, the first unit and the second unit may be present in a mole ratio of about 9:1 to about 5:5.

In an implementation, the copolymer may be in various forms, such as an alternating polymer in which the first and second units are alternately distributed, a random polymer in which they are randomly distributed, or a graft polymer in which a portion of structural units are grafted.

In a rechargeable lithium battery according to an embodiment, the positive electrode may include a positive current collector and a positive active material layer formed on the positive current collector. The positive active material layer may include a positive active material, a binder, and optionally a conductive material.

The positive current collector may include, e.g., aluminum, nickel, or the like.

The positive active material may include a compound capable of intercalating and deintercalating lithium. In an implementation, at least one of a composite oxide or a composite phosphate of a metal selected from cobalt, manganese, nickel, aluminum, iron, or a combination thereof and lithium may be used. For example, the positive active material may include lithium cobalt oxide, lithium nickel oxide, lithium manganese oxide, lithium nickel cobalt manganese oxide, lithium nickel cobalt aluminum oxide, lithium iron phosphate, or a combination thereof.

In an implementation, the binder of the positive active material layer may be the same as described for the electrode binder.

The binder according to another embodiment may be a suitable positive electrode binder that serves to adhere the positive electrode active material particles to each other as well as to adhere the positive electrode active material to the positive current collector. Examples of the positive electrode binder may include polyvinyl alcohol, carboxymethyl cellulose, hydroxypropyl cellulose, diacetyl cellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and the like. These may be used alone or as a mixture of two or more.

The conductive material imparts conductivity to an electrode. Examples thereof may include natural graphite, artificial graphite, carbon black, a carbon fiber, a metal powder, a metal fiber, and the like. These may be used alone or as a mixture of two or more. The metal powder and the metal fiber may use a metal of, e.g., copper, nickel, aluminum, silver, or the like.

The negative electrode may include a negative current collector and a negative active material layer formed on the negative current collector.

The negative current collector may include, e.g., copper, gold, nickel, a copper alloy, or the like.

The negative active material layer may include a negative active material, a binder, and optionally a conductive material. The negative active material may be a material that reversibly intercalates/deintercalates lithium ions, a lithium metal, a lithium metal alloy, a material capable of doping and dedoping lithium, a transition metal oxide, or a combination thereof.

The material that reversibly intercalates/deintercalates lithium ions may be a carbon material, e.g., a suitable carbon-based negative active material, and examples thereof may include crystalline carbon, amorphous carbon, or a combination thereof. Examples of the crystalline carbon may include graphite such as amorphous, plate-shape, flake, spherical shape or fiber-shaped natural graphite or artificial graphite. Examples of the amorphous carbon may include soft carbon or hard carbon, a mesophase pitch carbonized product, fired coke, and the like. The lithium metal alloy may be an alloy of lithium and a metal selected from Na, K, Rb, Cs, Fr, Be, Mg, Ca, Sr, Si, Sb, Pb, In, Zn, Ba, Ra, Ge, Al, and Sn. The material capable of doping and dedoping lithium may be Si, $SiO_x$ ($0<x<2$), a Si—C composite, a Si—Y' alloy, Sn, $SnO_2$, a Sn—C composite, a Sn—Y' alloy, and the like, and at least one of these may be mixed with SiO$_2$. The element Y' may be selected from Mg, Ca, Sr, Ba, Ra, Sc, Y, Ti, Zr, Hf, Rf, V, Nb, Ta, db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Tl, Ge, P, As, Sb, Bi, S, Se, Te, Po, and a combination thereof. The transition metal oxide may be vanadium oxide, lithium vanadium oxide, and the like.

In an implementation, the binder of the negative active material layer may be the same as described for the electrode binder.

In an implementation, the binder used for the negative electrode may be the same as the suitable positive electrode binder used for the positive electrode described above.

The type of the conductive material used for the negative electrode may be the same as the conductive material used in the aforementioned positive electrode.

The positive electrode and the negative electrode may be manufactured by mixing each active material composition including each active material and a binder, and optionally a conductive material in a solvent, and coating the active material composition on each current collector. In an implementation, the solvent may include, e.g., N-methylpyrrolidone or the like.

The electrolyte solution may include an organic solvent a lithium salt.

The organic solvent may serve as a medium for transmitting ions taking part in the electrochemical reaction of a battery. The organic solvent may include, e.g., a carbonate solvent, an ester solvent, an ether solvent, a ketone solvent, an alcohol solvent, or an aprotic solvent. The carbonate solvent may include, e.g., dimethylcarbonate, diethylcarbonate, dipropylcarbonate, methylpropylcarbonate, ethylpropylcarbonate, methylethylcarbonate, ethylenecarbonate, propylenecarbonate, butylenecarbonate, or the like. The ester solvent may include, e.g., methylacetate, ethylacetate, n-propylacetate, 1,1-dimethylethylacetate, methylpropionate, ethylpropionate, γ-butyrolactone, decanolide, γ-valerolactone, mevalonolactone, caprolactone, or the like. The ether solvent may include, e.g., dibutylether, tetraglyme, diglyme, dimethoxyethane, 2-methyltetrahydrofuran, tetrahydrofuran, or the like. The ketone solvent may include, e.g., cyclohexanone or the like. The alcohol solvent may include, e.g., ethanol, isopropyl alcohol, or the like. The aprotic solvent may include, e.g., nitriles such as R—CN (R is a C2 to C20 linear, branched, or cyclic hydrocarbon group, a double bond, an aromatic ring, or an ether bond), and the like, amides such as dimethyl formamide, dioxolanes such as 1,3-dioxolane, sulfolanes, and the like.

The organic solvent may be used alone or in a mixture of two or more, and when the organic solvent is used in a mixture of two or more, the mixture ratio may be controlled in accordance with a desirable cell performance.

The lithium salt may be dissolved in an organic solvent, may supply lithium ions in a battery, may basically operate the rechargeable lithium battery, and may help improve lithium ion transportation between positive and negative electrodes therein. Examples of the lithium salt may include LiPF$_6$, LiBF$_4$, LiSbF$_6$, LiAsF$_6$, LiN(SO$_3$C$_2$F$_5$)$_2$, LiN(CF$_3$SO$_2$)$_2$, LiC$_4$F$_9$SO$_3$, LiClO$_4$, LiAlO$_2$, LiAlCl$_4$, LiN(C$_x$F$_{2x+1}$SO$_2$)(C$_y$F$_{2y+1}$SO$_2$) (in which x and y are natural numbers), LiCl, LiI, LiB(C$_2$O$_4$)$_2$, or a combination thereof.

The lithium salt may be used in a concentration ranging from about 0.1 M to about 2.0 M. When the lithium salt is included within the above concentration range, an electrolyte may have excellent performance and lithium ion mobility due to optimal electrolyte conductivity and viscosity.

A rechargeable lithium battery may be classified into a lithium ion battery, a lithium ion polymer battery, and a lithium polymer battery depending on kinds of a separator and an electrolyte. It also may be classified to be cylindrical, prismatic, coin-type, pouch-type, and the like depending on shapes. In addition, it may be bulk type and thin film type depending on sizes.

Herein, as an example of a rechargeable lithium battery, a prismatic rechargeable lithium battery is for example described.

Figure 2:
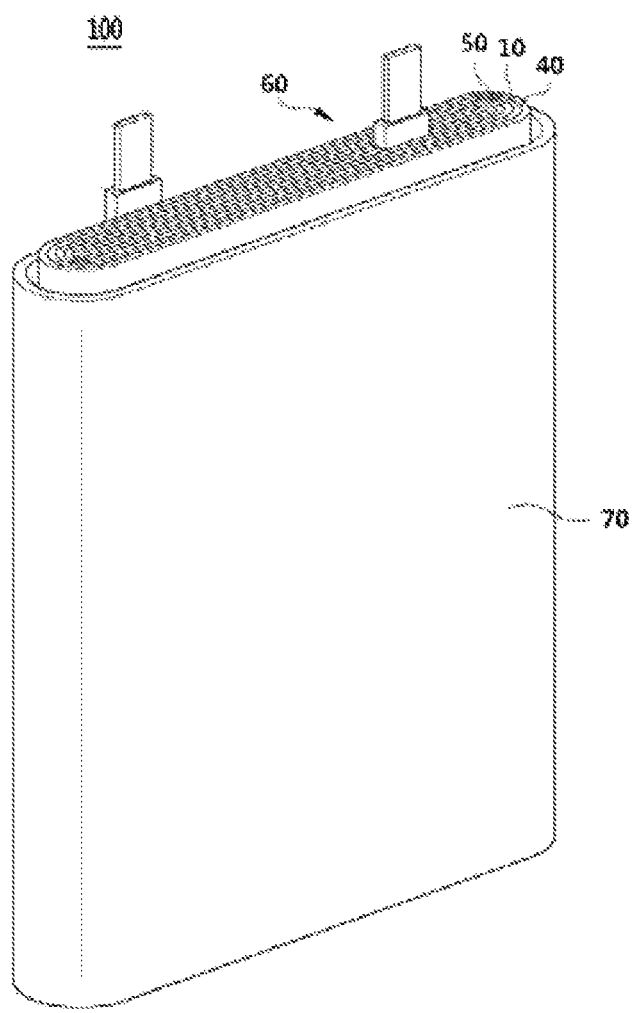
FIG. 2 illustrates an exploded perspective view of a rechargeable lithium battery according to an embodiment.

FIG. 2 is a partially exploded perspective view of a rechargeable lithium battery according to an embodiment.

Referring to FIG. 2, a rechargeable lithium battery 100 according to an embodiment may include an electrode assembly 60 manufactured by disposing a separator 10 between a positive electrode 40 and a negative electrode 50 and winding them, and a case 70 housing the electrode assembly 60.

The electrode assembly 60 may have, e.g., a jelly-roll shape formed by winding the positive electrode 40, the negative electrode 50, and the separator 10 disposed therebetween.

The positive electrode 40, the negative electrode 50, and the separator 10 may be impregnated with an electrolyte solution.

The following Examples and Comparative Examples are provided in order to highlight characteristics of one or more embodiments, but it will be understood that the Examples and Comparative Examples are not to be construed as limiting the scope of the embodiments, nor are the Comparative Examples to be construed as being outside the scope of the embodiments. Further, it will be understood that the embodiments are not limited to the particular details described in the Examples and Comparative Examples.

EXAMPLES

Example 1

Example 1-1

(Preparation of Separator)

8 wt % of a PVdF-HFP polymer having a weight average molecular weight (Mw) of 1,300,000 g/mol (a mole ratio of PVdF:HFP=97:3, a glass transition temperature: −30° C., a melting point: 155° C.) as a fluorine-containing binder was added to acetone and then, stirred with an agitator at 40° C. for 3 hours to prepare a binder solution. 20 wt % of alumina (Al$_2$O$_3$, LS-710A, Nippon Light Metal Co., Ltd.) was added to acetone and then milled and dispersed with a bead mill at 25° C. for 4 hours to prepare an inorganic dispersion.

The binder solution and the inorganic dispersion were mixed in a weight ratio of 25:75, and 1.5 wt % of an additive (a weight average molecular weight: 10,000 g/mol, P104 manufactured by BYK-Chemie) was added thereto, based on 100 wt % of the alumina solid and then, stirred with a stirrer at 25° C. for 1 hour to prepare coating liquid.

The coating liquid was coated on a 7.0 μm-thick polyethylene film (PE, SK Innovation Co., Ltd.) at 20 m/min in a direct metering method and dried at 60° C. under an absolute aqueous vapor amount (on average) of 14 g/m$^3$ to prepare a separator having a coating layer. A coating amount of the binder was adjusted into 3.5 g/m$^2$, and the coating layer was adjusted to have a thickness of 3.0 μm.

(Manufacture of Positive Electrode)

LiCoO$_2$, a PVdF homopolymer having a weight average molecular weight (Mw) of 1,000,000 g/mol (a glass transition temperature: −30° C., a melting point: 158° C.) as an electrode binder, and carbon black in a weight ratio of 96:2:2 were added to an N-methylpyrrolidone solvent to prepare a slurry. The slurry was coated on an aluminum thin film, dried, and then compressed at 25° C. to manufacture a positive electrode.

(Manufacture of Rechargeable Battery Cells)

Graphite, polyvinylidene fluoride, and carbon black in a weight ratio of 98:1:1 were added to an N-methylpyrrolidone solvent to prepare a slurry. The slurry was coated on a copper foil, dried, and compressed to manufacture a negative electrode.

The manufactured separator was disposed between the positive electrode and the negative electrode and then, wound together to form a jelly-roll electrode assembly. Subsequently, a 1.15 M $LiPF_6$ electrolyte solution was prepared by adding an appropriate amount of $LiPF_6$ to a mixed solvent of ethylene carbonate, ethylmethyl carbonate, and diethyl carbonate in a volume ratio of 3:5:2, and the electrolyte solution was injected into the electrode assembly and then, sealed to manufacture a rechargeable lithium battery cell.

Example 1-2

A separator, a positive electrode, and a rechargeable battery cell were manufactured according to the same method as Example 1 except that a PVdF-HFP polymer having a weight average molecular weight (Mw) of 1,000,000 g/mol (a mole ratio of PVdF:HFP=98:2, a glass transition temperature: −30° C., a melting point: 153° C.) was used as the fluorine-containing binder.

Example 1-3

A separator, a positive electrode, and a rechargeable battery cell were manufactured according to the same method as Example 1 except that a PVdF-HFP polymer having a weight average molecular weight (Mw) of 900,000 g/mol (a mole ratio of PVdF:HFP=97:3, a glass transition temperature: −30° C., a melting point: 149° C.) was used as the fluorine-containing binder.

Example 2-1

A separator, a positive electrode, and a rechargeable battery cell were manufactured according to the same method as Example 1-1 except that the additive amount was changed to 0.5 wt %.

Example 2-2

A separator, a positive electrode, and a rechargeable battery cell were manufactured according to the same method as Example 1-2 except that the additive amount was changed to 0.5 wt %.

Example 2-3

A separator, a positive electrode, and a rechargeable battery cell were manufactured according to the same method as Example 1-3 except that the additive amount was changed to 0.5 wt %.

Example 3-1

A separator, a positive electrode, and a rechargeable battery cell were manufactured according to the same method as Example 1-1 except that the positive electrode slurry was compressed at 40° C.

Example 3-2

A separator, a positive electrode, and a rechargeable battery cell were manufactured according to the same method as Example 1-2 except that the positive electrode slurry was compressed at 40° C.

Example 3-3

A separator, a positive electrode, and a rechargeable battery cell were manufactured according to the same method as Example 1-3 except that the positive electrode slurry was compressed at 40° C.

Comparative Example 1-1

A separator, a positive electrode, and a rechargeable battery cell were manufactured according to the same method as Example 1-1 except that the additive was not included.

Comparative Example 1-2

A separator, a positive electrode, and a rechargeable battery cell were manufactured according to the same method as Example 1-2 except that the additive was not included.

Comparative Example 1-3

A separator, a positive electrode, and a rechargeable battery cell were manufactured according to the same method as Example 1-3 except that the additive was not included.

Comparative Example 2

A separator, a positive electrode, and a rechargeable battery cell were manufactured according to the same method as Example 1-2 except that the additive was not included, and the coating layer drying was performed at 40° C.

Comparative Example 3

A separator, a positive electrode, and a rechargeable battery cell were manufactured according to the same method as Example 1-2 except that the additive was not included, and the coating layer drying was performed at 80° C.

Comparative Example 4

A separator, a positive electrode, and a rechargeable battery cell were manufactured according to the same method as Example 1-2 except that the additive was not included, and the coating layer drying was performed at 90° C.

Comparative Example 5

A separator, a positive electrode, and a rechargeable battery cell were manufactured according to the same method as Example 1-1 except that a PVdF homopolymer having a weight average molecular weight (Mw) of 1,000,000 g/mol (a glass transition temperature: −30° C., a melting point: 158° C.) was used as the fluorine-containing binder, and the additive was not included.

Comparative Example 6

A separator, a positive electrode, and a rechargeable battery cell were manufactured according to the same method as Example 1-1 except that a PVdF homopolymer having a weight average molecular weight (Mw) of 900,000 g/mol (a glass transition temperature: −30° C., a melting point: 155° C., and not including a COOH functional group) was used as the fluorine-containing binder, and the additive was not used.

Comparative Example 7

A separator, a positive electrode, and a rechargeable battery cell were manufactured according to the same method as Example 1-1 except that a PVdF-co-HFP copolymer having a weight average molecular weight (Mw) of 600,000 g/mol (a mole ratio of PVdF:HFP=98:2, a glass transition temperature: −30° C., a melting point: 149° C.) was used as the fluorine-containing binder, and the additive was not included.

Comparative Example 8

A separator, a positive electrode, and a rechargeable battery cell were manufactured according to the same method as Example 1-1 except that a PVdF-co-HFP copolymer having a weight average molecular weight (Mw) of 1,300,000 g/mol (a mole ratio of PVdF:HFP=98:2, a glass transition temperature: −30° C., a melting point: 149° C., and not including a COOH functional group) was used as the fluorine-containing binder, and the additive was not included.

Comparative Example 9

A separator, a positive electrode, and a rechargeable battery cell were manufactured according to the same method as Example 1-1 except that a PVdF homopolymer having a weight average molecular weight (Mw) of 500,000 g/mol (a glass transition temperature: −30° C., a melting point: 149° C., and not including a COOH functional group) was used as the fluorine-containing binder, and the additive was not included.

Comparative Example 10

A separator, a positive electrode, and a rechargeable battery cell were manufactured according to the same method as Example 1-1 except that a PVdF-co-HFP copolymer having a weight average molecular weight (Mw) of 450,000 g/mol (a mole ratio of PVdF:HFP=98:2, a glass transition temperature: −30° C., a melting point: 149° C.) was used as the fluorine-containing binder, and the additive was not included.

Evaluation Example 1: Measurement of Crystallinity Degree of Binder

Measurement of Crystallinity Degree of Fluorine-Containing Binder

The coating layers of the separators for a rechargeable battery cell according to Examples 1-1 to 3-3 and Comparative Examples 1-1 to 10 were respectively peeled off by hand to obtain specimens. The specimens were measured by using Magnet: 14.1 Tesla ASCEND Aeon WB (Frequency: 564-600) in a measuring equipment, AVANCE NEO600 (Bruker BioSpin GmbH) to obtain PVdF Crystal/Amorphous spectra. Herein, the measurement was performed under optimized conditions as shown in Table 1. Based on the obtained spectra, SS-NMR spectra of the specimens were respectively analyzed. After fitting the spectrum of each specimen, deconvolution thereof was performed to calculate an area with respect to each peak. An area ratio of a crystalline peak relative to a sum area of an amorphous peak and a crystalline peak was calculated to obtain a crystallinity degree of the fluorine-containing binder. The results are shown in Tables 2 and 3, and the PVdF Crystalline/Amorphous spectrum according to Example 1-1 is shown in FIG. 3.

Figure 3:
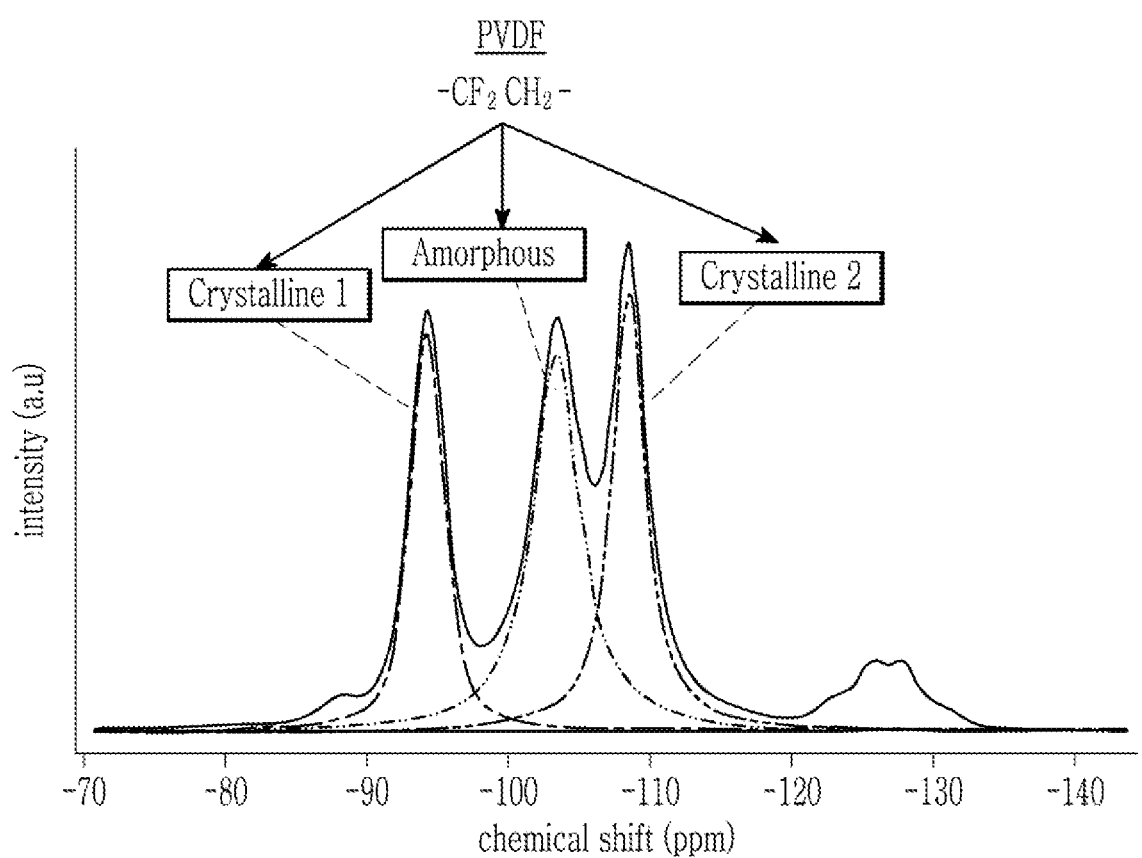
FIG. 3 illustrates the PVdF crystal/amorphous spectrum of the separator of Example 1-1.

In the NMR spectrum of FIG. 3, "Crystalline 1" and "Crystalline 2" indicate each crystalline peak and "Amorphous" indicates an amorphous peak.

TABLE 1

| MAS rate | 60 kHz |
| Temperature | 298.1 K |
| Pulse program | hpdec |
| Time domain size (TD) | 5120 |
| Spectral width (SW) | 700 ppm |
| Receiver gain (RG) | 8 |
| Relaxation delay (D1) | 5 s |
| Number of scans (NS) | 32 |
| 19 F. 90° pulse width (p1) | 1.5 μs |
| 19 F. 90° pulse power level (plw1) | 80 W |
| Experiment time | 2 min 40 sec |

* Measurement of Crystallinity Degree of Electrode Binder

The same method as the method of measuring the crystallinity degree of the fluorine-containing binder was conducted to measure a crystallinity degree of an electrode binder and then, calculate a ratio of the crystallinity degree of the electrode binder relative to that of the fluorine-containing binder. The results of Examples 1-1 to 2-3 and 3-3 are shown in Table 3.

Evaluation Example 2: Measurement of Distribution of Fluorine-Containing Binder

Each distribution of the fluorine-containing binder of the separators along a thickness direction was analyzed by using an ATR-FTIR (Attenuated Total Reflectance-Fourier Transform Infrared Ray) spectroscopy. The separators for the rechargeable battery cells according to Examples 1-1 to 3-3 and Comparative Examples 1-1 to 10 were sized into a size of (L) 100 mm×(W) 100 mm to obtain specimens. The obtained specimens were respectively mounted on an ATR crystal of an FT-IR spectroscope, and after irradiating an infrared ray at an incident angle of 45° thereinto, intensity of an IR wavelength of a C—F group, a functional group of the fluorine-containing binders, was measured to evaluate the distributions of the fluorine-containing binder. The results are shown in Table 2.

Evaluation Example 3: Measurement of Air Permeability of Separator

The separators of Examples 1-1 to 3-3 and Comparative Examples 1-1 to 10 were evaluated by measuring time (second) taken for air of 100 cc to permeate each of them with an air permeability-measuring device (EG01-55-1MR, Asahi Seiko Co., Ltd.). The results are shown in Table 2.

Evaluation Example 4: Evaluation of Interfacial Adhesion (Bending Strength) Between Separator and Electrode In order to evaluate interfacial adhesion between a separator and an electrode, the rechargeable battery cells according to Examples 1-1 to 3-3 and Comparative Examples 1-1 to 10 were 10 cycles charged and discharged, and the interfacial adhesion thereof was evaluated in a discharge state of the cells. The cells were respectively positioned so that middle points of lengths the cells might meet a right center of span. Load cells having a maximum load of 1 kN were respectively mounted in a jig and compressed at 5 mm/min in a vertical direction to measure maximum strength when the cells were bent. The results are shown in Table 3.

Herein, the bending strength was measured by using Single column (Instron-3344), wherein the cells had a size of (L) 40.5 mm×W75 mm×(T) 5.1 mm.

Evaluation Example 5: Evaluation of Adhesion Force of Substrate

In order to evaluate an adhesion force between a porous substrate and a coating layer, the separators according to Examples 1-1 to 1-3 and Comparative Example 2 were respectively adhered to a specimen with a tape 3M to have a size of width 12 mm×length 150 mm and then, uniformly compressed with a hand roller. The compressed specimens were cut 2.0 mm larger than the tape size to obtain test specimens. The test specimens were respectively fixed with upper/lower grips and then, peeled from 10 mm to 40 mm at 20 mm/min in a direction of 180° to measure peel strength three times by using UTM (Instron Company) and average the measurements. The results are shown in Table 2.

TABLE 2

| | Crystallinity degree of fluorine-containing binder (%) | Binder distribution (IR intensity) | Air permeability(sec/100 cc) | Bending strength (N) | Adhesion force of the substrate (N) |
|---|---|---|---|---|---|
| Example 1-1 | 52 | 0.0043 | 49 | 536 | 0.41 |
| Example 1-2 | 53 | 0.0048 | 45 | 548 | 0.36 |
| Example 1-3 | 51 | 0.0046 | 43 | 528 | 0.39 |
| Example 2-1 | 56 | 0.0039 | 57 | 505 | — |
| Example 2-2 | 53 | 0.0037 | 55 | 497 | — |
| Example 2-3 | 52 | 0.0038 | 53 | 488 | — |
| Comparative Example 1-1 | 55 | 0.0029 | 61 | 453 | — |
| Comparative Example 1-2 | 55 | 0.0028 | 58 | 448 | — |
| Comparative Example 1-3 | 51 | 0.0027 | 56 | 465 | — |
| Comparative Example 2 | 61 | 0.0058 | 45 | 560 | 0.12 |
| Comparative Example 3 | 43 | 0.0029 | 89 | 396 | — |
| Comparative Example 4 | 42 | 0.0025 | 96 | 379 | — |
| Comparative Example 5 | 59 | 0.0028 | 64 | 478 | — |
| Comparative Example 6 | 61 | 0.0033 | 66 | 488 | — |
| Comparative Example 7 | 37 | 0.0038 | 49 | 351 | — |
| Comparative Example 8 | 41 | 0.0033 | 52 | 409 | — |
| Comparative Example 9 | 43 | 0.0027 | 79 | 243 | — |
| Comparative Example 10 | 42 | 0.0042 | 41 | 310 | — |

Referring to Table 2, the separators according to Examples 1-1 to 2-3 included the additive, exhibited an IR distribution of 0.0030 to 0.0050 and crystallinity degrees of the fluorine-containing binders within a desirable range, and air permeability of the separators and interfacial adhesion between separators and electrodes were all excellent. On the contrary, the Comparative Examples exhibited deteriorated effects compared with the Examples. For example, Comparative Example 2 exhibited higher bending strength compared with the Examples but the crystallinity degree and the IR distribution of the fluorine-containing binder were outside of the ranges described herein, and accordingly, adhesion force (peel strength) of the substrate was greatly deteriorated compared with those of Examples 1-1 to 1-3.

TABLE 3

| | Crystallinity degree (C1) of fluorine-containing binder (%) | Crystallinity degree (C2) of electrode binder (%) | Ratio of crystallinity degrees (C2/C1) | Bending strength (N) |
|---|---|---|---|---|
| Example 1-1 | 52 | 76 | 1.43 | 536 |
| Example 1-2 | 53 | 76 | 1.52 | 548 |
| Example 1-3 | 51 | 76 | 1.55 | 528 |
| Example 2-1 | 56 | 76 | 1.43 | 505 |
| Example 2-2 | 53 | 76 | 1.52 | 497 |
| Example 2-3 | 52 | 76 | 1.55 | 488 |
| Example 3-3 | 50 | 82 | 1.67 | 476 |

Referring to Table 3, Examples 1-1 to 2-3 exhibited crystallinity degrees (C1) of the fluorine-containing binders, crystallinity degrees (C2) of the electrode binders, and crystallinity degree ratios (C2/C1) all within the ranges described herein, and thus exhibited excellent interfacial adhesion (bending strength) between separator and electrode. Referring to the result of Example 3-3 of Table 3, when the crystallinity degree (C2) of the electrode binders and the crystallinity degree ratios (C2/C1) were out of the ranges described herein and thus may be a little disadvantageous in terms of bending strength.

Evaluation Example 6: Measurement of Separator Surface Roughness (Rq)

Surface roughness of the separators according to Examples 1-1 to 2-3 and Comparative Examples 1-1 to 1-3 was measured by using AFM (Atomic force microscopy), and the results are shown in Table 4.

TABLE 4

| | Surface Roughness (nm) |
|---|---|
| Example 1-1 | 226 |
| Example 1-2 | 260 |

TABLE 4-continued

| | Surface Roughness (nm) |
|---|---|
| Example 1-3 | 240 |
| Example 2-1 | 190 |
| Example 2-2 | 160 |
| Example 2-3 | 166 |
| Comparative Example 1-1 | 144 |
| Comparative Example 1-2 | 135 |
| Comparative Example 1-3 | 136 |

Referring to Table 4, when the surface roughness was less than 150 nm, the fluorine-containing binders were present among filler particles of the coating layers, the binders were not effectively anchored toward electrodes even though heat-pressed during the cell manufacturing process, and the interfacial adhesion between separator/electrode might be reduced. In addition, when the surface roughness was greater than 300 nm, the coating layers might exhibit a non-uniform thickness (distribution) problem, and most of the fluorine-containing binders in the coating layers may be positioned at an upper portion of the filler particles (at an electrode side with a reference of thickness directions of the coating layers), which might decrease adhesion force (peel strength) of the coating layers to the substrates and deteriorate quality thereof. When the surface roughness was 150 nm to 300 nm, most of the binders were appropriately present in the upper portion of the filler particles as well as left/right portions thereof, and accordingly, even though mildly heat-pressed, the fluorine-containing binders of the separators were easily anchored toward the interfaces of the electrodes, and accordingly, the interfacial adhesion between separator/electrode might be improved. Referring to Table 4, the surface roughness (Rq) of the separators according to Examples 1-1 to 2-3 was 150 nm to 300 nm, and that of the separators according to Comparative Examples 1-1 to 1-3 was not.

By way of summation and review, when positive and negative electrodes are repetitively contracted and expanded during the charge and discharge cycles or exothermic heat due to abnormal operation of a battery becomes large, battery temperature may be abruptly increased. In this case, a separator could be abruptly contracted or destroyed, short-circuit of electrodes may occur.

A method of securing battery stability may include forming a coating layer including heat-resistant inorganic particles and an adhesive binder on at least one surface of the separator. In order to increase capacity of the rechargeable lithium battery, a thickness of a separator may be decreased. As the thickness of the separator becomes thinner, the thickness of the coating layer may decrease, thereby reducing an adhesive strength between the separator and the electrode plate. When the adhesive strength of the separator is reduced, it could cause a decrease in cycle-life of the battery.

Although an acrylic binder having strong adhesive strength may be used as an adhesive binder, the acrylic binder may be swelled sensitively to an electrolyte solution and may fail to secure a desired level of adhesive strength.

One or more embodiments may provide a separator for a rechargeable battery capable of maintaining a high adhesive strength while reducing a thickness of the separator by minimizing an amount of binder.

Adhesive on the interface between the separator and electrode may be improved, a movement path of lithium ions may be shortened, and lithium deposition and dead lithium layers (precipitated lithium layers and electrically shorts) may be prevented so that battery cycle-life and battery strength may be improved at the same time, improving collision safety.

Hereinbefore, the certain embodiments of the present invention have been described and illustrated, however, it is apparent to a person with ordinary skill in the art that the present invention is not limited to the embodiment as described, and may be variously modified and transformed without departing from the spirit and scope of the present invention. Accordingly, the modified or transformed embodiments as such may not be understood separately from the technical ideas and aspects of the present invention, and the modified embodiments are within the scope of the claims of the present invention.

What is claimed is:

1. A separator for a rechargeable battery, the separator comprising:
   a porous substrate; and
   at least one coating layer on one surface of the porous substrate, wherein:
   the at least one coating layer includes a fluorine-containing binder having a crystallinity degree of 51% to 58%, a filler, and an additive,
   the fluorine-containing binder is included in an amount of about 20 wt % to about 30 wt %,
   the additive is included in an amount of greater than 0.35 wt % to less than 1.25 wt %, the wt % being based on a total weight of the at least one coating layer,
   the fluorine-containing binder has a concentration gradient in which a concentration thereof in the at least one coating layer increases toward an outer surface of the separator in a thickness direction of the separator,
   an infrared spectral intensity of the C—F group of the fluorine-containing binder is greater than 0.0030 to less than 0.0050,
   wherein the infrared spectral intensity of a C—F group of the fluorine-containing binder is measured as a functional group of the fluorine-containing binder to evaluate a distribution of the fluorine-containing binder when separator specimens are mounted on an ATR crystal of a FT-IR spectroscopy and infrared rays are entered at a 45 degree angle,
   the additive is a hydrocarbon polymer compound that includes a carboxyl group, and
   a weight average molecular weight of the hydrocarbon polymer compound is about 5,000 g/mol to about 15,000 g/mol.

2. The separator as claimed in claim 1, wherein the infrared spectral intensity of the C—F group of the fluorine-containing binder is greater than 0.0035 to less than 0.0050.

3. The separator as claimed in claim 1, wherein the fluorine-containing binder has a crystal size of about 1 nm to about 5 nm.

4. The separator as claimed in claim 1, wherein the fluorine-containing binder is a vinylidene fluoride polymer.

5. The separator as claimed in claim 1, wherein the fluorine-containing binder is a vinylidene fluoride homopolymer or a copolymer including a unit of vinylidene fluoride and a unit of another monomer.

6. The separator as claimed in claim 1, wherein the fluorine-containing binder includes a functional group including a carboxyl group.

7. The separator as claimed in claim 1, wherein the fluorine-containing binder has a weight average molecular weight of about 800,000 g/mol to about 1,300,000 g/mol.

8. The separator as claimed in claim 1, wherein the filler includes a metal oxide, a semi-metal oxide, a metal fluoride, a metal hydroxide, or a combination thereof.

9. The separator as claimed in claim 1, wherein the filler has a concentration gradient in which a concentration thereof in the at least one coating layer decreases toward the outer surface of the separator in the thickness direction of the separator.

10. The separator as claimed in claim 1, wherein the at least one coating layer has a surface roughness (Rq) of about 150 nm to about 300 nm.

11. The separator as claimed in claim 1, wherein the at least one coating layer has a surface pore size of about 50 nm to about 1,000 nm.

12. A method of preparing a separator, the method comprising:
preparing a composition for forming a coating layer by dispersing a fluorine-containing binder, a filler, and an additive in a solvent;
coating the composition for forming the coating layer on one or both surfaces of a porous substrate to form at least one coating layer; and
drying it under a humidified atmosphere of about 40° C. to about 80° C. and an absolute aqueous vapor amount of about 10 g/m$^3$ to about 25 g/m$^3$, wherein:
the additive is a hydrocarbon polymer compound that includes a head group including a carboxyl group and a tail group including a substituted or unsubstituted aliphatic hydrocarbon polymer structure,
the fluorine-containing binder is included in an amount of about 20 wt % to about 30 wt %,
the additive is included in an amount of greater than 0.35 wt % to less than 1.25 wt %, the wt % being based on a total weight of the at least one coating layer,
the fluorine-containing binder has a crystallinity degree of 51% to 58%,
the fluorine-containing binder has a concentration gradient in which a concentration thereof in the at least one coating layer increases toward an outer surface of the separator in a thickness direction of the separator, and
a weight average molecular weight of the hydrocarbon polymer compound is about 5,000 g/mol to about 15,000 g/mol.

13. The method as claimed in claim 12, wherein the drying is performed in a humidified atmosphere of a temperature of about 50° C. to about 70° C. and an absolute aqueous vapor amount of about 10 g/m$^3$ to about 20 g/m$^3$.

14. A rechargeable lithium battery, comprising:
a positive electrode;
a negative electrode;
the separator for a rechargeable battery as claimed in claim 1 between the positive electrode and the negative electrode; and
an electrolyte solution.

15. The rechargeable lithium battery as claimed in claim 14, wherein:
at least one of the positive electrode and negative electrode includes an electrode active material and an electrode binder, and
a ratio (C2/C1) of a crystallinity degree (C2) of the electrode binder to a crystallinity degree (C1) of the fluorine-containing binder is about 1.40 to about 1.60.

16. The rechargeable lithium battery as claimed in claim 15, wherein the electrode binder has a crystallinity degree of about 70% to about 80%.

17. The rechargeable lithium battery as claimed in claim 15, wherein the electrode binder is a vinylidene fluoride homopolymer or a copolymer including a unit of vinylidene fluoride and a unit of another monomer.

18. A separator for a rechargeable battery, the separator comprising:
a porous substrate; and
at least one coating layer on one surface of the porous substrate, wherein:
the at least one coating layer includes a fluorine-containing binder having a crystallinity degree of 51% to 58%, a filler, and an additive,
the fluorine-containing binder has a concentration gradient in which a concentration thereof in the at least one coating layer increases toward an outer surface of the separator in a thickness direction of the separator,
the additive is a hydrocarbon polymer compound that includes a head group including a carboxyl group and a tail group including a substituted or unsubstituted aliphatic hydrocarbon polymer structure,
the fluorine-containing binder is included in an amount of about 20 wt % to about 30 wt %,
the additive is included in an amount of greater than 0.35 wt % to less than 1.25 wt %, the wt % being based on a total weight of the at least one coating layer, and
a weight average molecular weight of the hydrocarbon polymer compound is about 5,000 g/mol to about 15,000 g/mol.

* * * * *